United States Patent Office 3,493,307
Patented Feb. 3, 1970

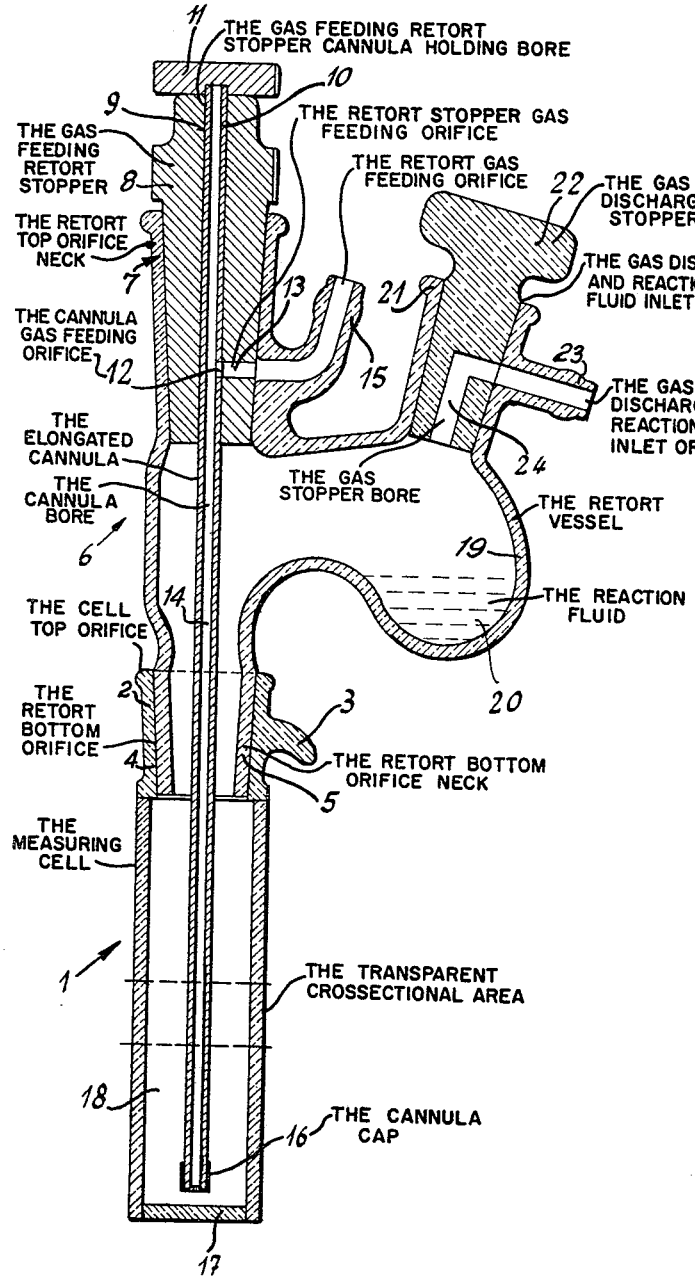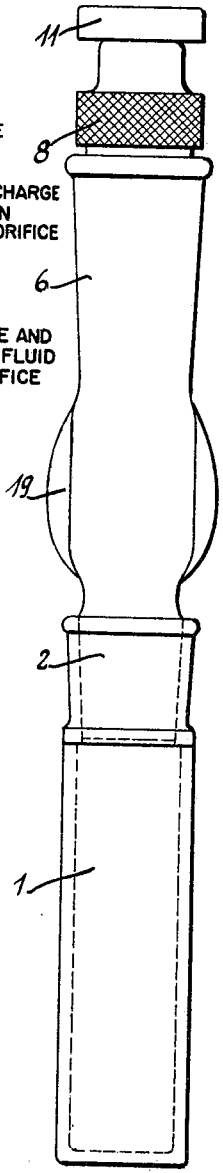
Feb. 3, 1970   P. MAYER   3,493,307
DEVICE FOR THE PHOTOMETRIC AND/OR SPECTROPHOTOMETRIC MEASUREMENT AND TREATMENT OF FLUIDS
Filed April 6, 1966    2 Sheets-Sheet 1
INVENTOR
Peter Mayer
ATTORNEY

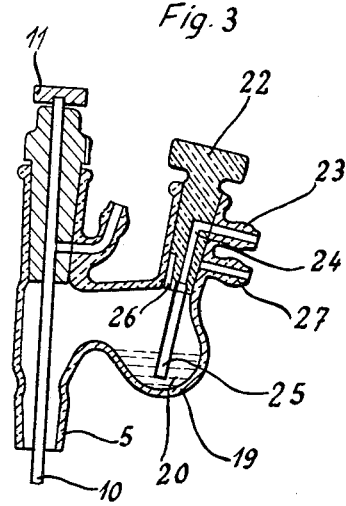
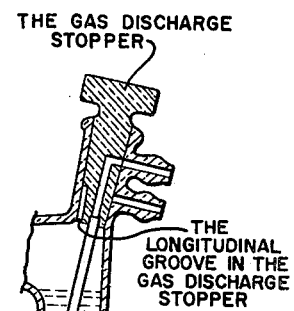
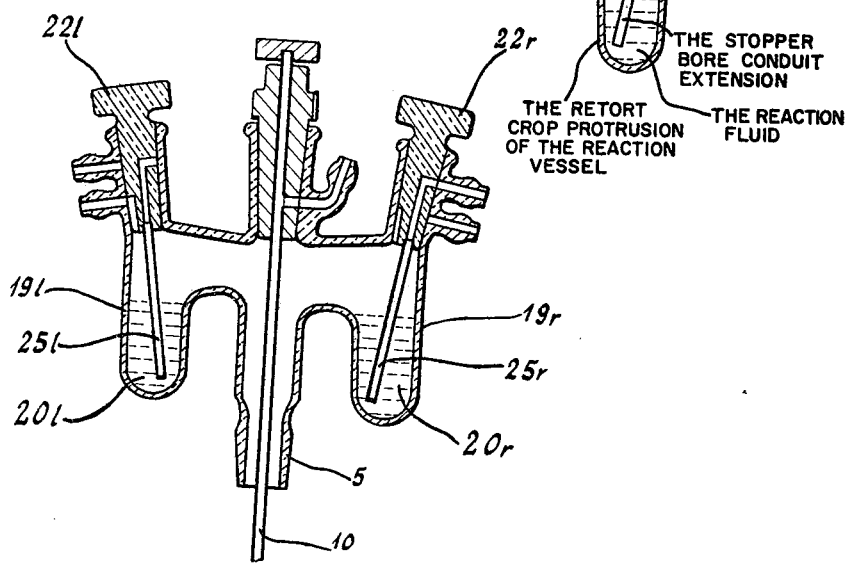

3,493,307
DEVICE FOR THE PHOTOMETRIC AND/OR SPECTROPHOTOMETRIC MEASUREMENT AND TREATMENT OF FLUIDS
Peter Mayer, Mullheim, Baden, Germany, assignor to Hellma G.m.b.H. & Co., Mullheim, Baden, Germany, a firm
Filed Apr. 6, 1966, Ser. No. 540,565
Claims priority, application Germany, Apr. 9, 1965, H 55,748
Int. Cl. G01n 1/10
U.S. Cl. 356—246         9 Claims

ABSTRACT OF THE DISCLOSURE

A combination of a photometric cell with a multi-shaped gas-collecting chamber and a reaction fluid storing vessel for photometric and/or spectrometric measurements and additional treatments of fluids, especially suitable for subjecting the fluids to be measured together with the reaction fluids to the action of gases, having detachable tightly sealing joints of separable parts, a retractable gas charging cannula to prevent inward leakage of air and to permit a passage of light undisturbed by the device itself for disturbance-free measurements, a number of hermetically sealing valve means permitting their selective use and cropped vessels allowing for a plurality of oxygen-free measurement and treatment operations.

FIELD OF THE INVENTION

This invention relates to a cell for the photometric and/or spectrophotometric measurement of fluids with a device for subjecting the fluid to be measured to the action of a gas, especially for removing oxygen contained in the fluid.

BACKGROUND OF THE INVENTION

Description of the prior art

When measuring fluids in a known manner with the aid of a measuring cell, it is often required to charge the fluid to be measured with a gas prior to or, if desired, also during the measuring operation. Also, it is very often indispensable to such measurements that the fluid to be measured and a so-called reaction fluid which is to be added to the test fluid are made free from oxygen within the cell. In this case, however, it is essential that the fluids contained in the cell during the working process continue remaining free from oxygen, for which purposes a hermetic sealing of the measuring chamber of the cell from the outer air is required, which sealing is to be maintained at least for the period of measuring.

SUMMARY OF THE INVENTION

It is the object of the present invention to provide improvements in a measuring cell having the aforesaid properties. These improvements relate to a more perfect mode of subjecting the test fluid to the action of a gas and to provisions permitting the light beam to pass, during the measuring operation, through the cell over the full cross-sectional area thereof without hindrance through the means serving to subject the test fluid to the action of the gas. Finally, a further improvement in the novel measuring cell resides in that in addition to the test fluid proper also the reaction fluid can be made completely free from oxygen before it is added to the test fluid and that this can be achieved with means easy to operate and of relatively simple construction.

This object is achieved according to the present invention by providing a cell for the photometric and/or spectrophotometric measurement of fluids in combination with a device for subjecting the fluid to be measured to the action of a gas, especially for removing oxygen contained in said fluid, which comprises a measuring chamber, a cannula for the gas supply associated with the cell and introducible into said measuring chamber of the cell down to the region of the bottom thereof, the arrangement being such that said cannula is retractable, during the measuring operation, upwardly beyond said measuring chamber of the cell and especially such that during the retraction of said cannula or during turning of said cannula about the longitudinal axis thereof the gas intake of said cannula is hermetically sealed, and a gas collecting chamber having an optionally openable and closable outlet and connected to the measuring cell preferably at the feed opening of the cell at the upper end thereof.

Several embodiments of the invention will now be described by way of example and with reference to the accompanying drawings, in which:

FIG. 1 is a central longitudinal through a simple embodiment of a measuring cell according to the invention, the measuring cell being provided with a slidable and turnable cannula and with a gas collecting chamber serving at the same time as a reaction vessel and having a turnable stopper seated in its upper opening;

FIG. 2 is a side elevation view of the measuring cell of FIG. 1, showing the side of the cell that is opposite the gas collecting chamber;

FIG. 3 is a central longitudinal section through another embodiment of the attachable piece of the measuring cell, the stopper closing the gas collecting chamber at the top thereof being constructed as a two-way cock and two connection pieces being provided on the ground tube of the reaction vessel for establishing a connection between the stopper and the outside, and FIG. 4 is a central longitudinal section through a further embodiment of the attachable piece of the measuring cell, showing a twin type arrangement of the attachable piece of FIG. 3.

FIG. 4a is a fragmentary view of FIG. 4, wherein the cell components are labeled with terms from the dictionary contained on page 9 of the specification.

Referring to FIGS. 1 and 2, the reference numeral 1 designates generally a so-called standard cell as modified in accordance with the principles of the present invention. To the top end of this cell 1 forming the feed opening a reinforced ground taper piece 2 is firmly connected by melting. This ground taper piece 2 which may have a handle 3 has a bore 4 of optimum size. Inserted in the bore 4 of the ground taper piece 2 is a matching ground tube 5 of an attachable piece designated generally by reference numeral 6. This attachable piece 6 is provided at its upper end centrally of the cell 1 with a ground tube 7 in which a relatively long taper stopper 8 is inserted which is preferably made of a high-quality synthetic plastic material.

The taper stopper 8 has a central bore 9 in which a cannula 10 is inserted in such a way that it engages on its outer side the wall of the bore 9 in an airtight manner but, nevertheless, can be shifted lengthwise in the stopper 8 and also turned about its longitudinal axis. For this purpose the cannula 10 is provided at its upper end with a handle 11 constructed as a rotary knob. The cannula 10 has in its wall an opening 12 which can be brought into communication with a transverse bore 13 in the stopper 8 which extends substantially perpendicularly to a longitudinal bore 14 in the cannula 10 and which in turn can be brought into communication through a connecting piece 15 on the ground tube 7, with the open air or with a gas supply pipe (not shown) fitted on the connecting piece 15.

This permits a gas to be supplied through the connecting piece 15 and the transverse bore 13 into the longitudinal bore 14 in the cannula 10. The lower end of the bore 14 in the cannula 10 is closed expediently by a cap 16 e.g. of polyvinyl chloride which can be slipped on to the cannula or is firmly and tightly fixed thereon. Formed centrally in this cap is at least one pin prick-like small hole through which the gas fed through the cannula 10 can pass in the form of fine bubbles into a test fluid in the vicinity of a bottom plate 17 of the cell which closes the lower end of a measuring chamber 18 containing the test fluid. Due to the gas ascending in the test fluid in the form of fine bubbles, the test fluid is prevented from foaming in the interior of the cell, which might be detrimental to the measuring operation and which, in unfavorable cases, might also have a disadvantageous effect on a reaction fluid 20 contained in an associated reaction vessel 19.

When a suitable gas stream is fed through the cannula 10 into the cell 1 in the above-described manner, this gas ascends in the form of finely distributed bubbles in the fluid contained in the cell. This causes the oxygen existing in the test fluid in dissolved or combined state to be removed from the fluid. The oxygen leaves the cell through the ground tube 5 and thus passes into the reaction vessel 19 serving at the same time as a gas collecting chamber. This vessel 19 has at its top an opening defined by a ground tube 21 in which a ground stopper 22 is seated which has an angular bore 24 so that when turning the ground stopper 22, the same will act as a cock. To the ground tube 21 of the reaction vessel 19 a connection piece 23 is fixed through which the gas can escape from the reaction vessel when the stopper 22 is in its open position. For this purpose the connection piece 23 expediently has a flexible tube (not shown) fitted thereon which extends downwardly into a water-filled vessel through which the gas can escape, whereby air is absolutely prevented from flowing again into the reaction vessel.

When a sufficient amount of gas has passed in the form of bubbles through the test fluid contained in the cell, the cannula 10 will be retracted in the bore 9 in the stopper 8 to such an extent that the measuring space in the measuring chamber 18 of the cell is completely free over its entire cross-sectional area for the passage of the measuring light therethrough. This permits the light beam to pass through the measuring cell without hindrance. The lifting or turning of the cannula 10 at the same time causes the gas inlet opening 12 in the wall of the cannula to be hermetically closed. When then the stopper 22 is turned into its closing position, the cell is hermetically sealed all round from the outer air. The flexible gas supply and offtake tubes which may disturb the measuring operation can now be completely removed from the cell.

In order to further improve measurements of the kind in question, also the reaction fluid 20 contained in the reaction vessel 19 and to be added to the test fluid prior to or during the measurement by tilting the cell may be made free from oxygen to the largest possible extent. For this purpose, as shown in the embodiment of FIG. 3, the lower end of the bore 24 in the stopper 22 can have a small tube 25 connected thereto which extends substantially down to the bottom of the reaction vessel. When a suitable gas is fed from outside through the connection piece 23 with the stopper 22 in the position shown in FIG. 3, this gas will pass in the form of bubbles from the bottom upwardly through the reaction fluid 20 and remove oxygen or the like therefrom as desired. When this has been done to a sufficient extent, the stopper 22 will be turned into a position closing the gas intake. This position can have an outlet 26 in the stopper 22 associated therewith in such a manner that the outlet, after turning of the stopper 22, is brought into communication with a second connection piece 27 on the ground tube 21. Through this outlet the gas forming during the removal of oxygen from the reaction fluid can then escape under the excess pressure arising in the reaction vessel 19. When this has happened, the stopper 22 will be turned into a third position in which hermetically seals the reaction vessel. The measuring operation can now be carried out with the complete exclusion of air while utilizing the reaction fluid which has become free from oxygen.

FIG. 4 shows a further improved embodiment which is based on the provisions described with reference to FIG. 3. As it also occurs in practice that it must be worked with at least two reaction fluids, the attachable piece of FIG. 3 can be converted into a twin type attachable piece as shown in FIG. 4. In this case a right-hand reaction vessel 19r and a left-hand reaction vessel 19l are arranged symmetrically about the ground tube 5 with the centrally inserted cannula 10. These two reaction vessels have the same parts associated therewith as already described with reference to FIG. 3. These parts are designated by the same reference numerals with the exception that the parts pertaining to the right-hand reaction vessel 19r have the small letter r added to their reference numeral and the parts pertaining to the left-hand reaction vessel 19l have the small letter l added to their reference numeral. Also in this case each reaction vessel has a small tube 25r or 25l, respectively, associated therewith for feeding a gas into the reaction fluid. These small tubes, also in this case, have at their lower ends a needle prick-like small opening corresponding to the opening formed in the cap 16 of FIG. 1.

As the reaction fluids are concerned with relatively small amounts of fluid, a relatively substantially shorter period of time will be sufficient for subjecting them to the action of the gas. By alternately turning the stoppers 22r and 22l into the proper positions, the gas emerging during the removal of oxygen from the reaction fluid contained in one reaction vessel can then be caused to escape through the outlet in the stopper of the other reaction vessel and vice versa. Expediently, the multiple arrangement as shown in FIG. 4 should be provided in pairs, in which case four reaction vessels form a double twin type arrangement.

With the aid of the above-described cells anaerobic measurements can be carried out under optimum conditions hitherto not achievable.

The invention may be embodied in other specific forms without departing from the spirit or essential characteristics thereof. The present embodiments are therefore to be considered in all respects as illustrative and not restrictive.

The following dictionary is established for claim purposes: The measuring cell 1; the cell top orifice 2; the transparent cross-sectional area 18; the retort vessel 19; the retort bottom orifice 5; the retort top orifice 7; the elongated cannula 10; the cannula gas feeding orifice 12; the gas discharge and reaction fluid inlet neck 21; the gas feeding retort stopper 8; the gas feeding retort stopper cannula holding bore 9; the retort gas feeding orifice 15; the vertical cannula bore 14; the retort-stopper gas feeding orifice 13'; the gas discharge stopper 22; the gas discharge and reaction fluid inlet orifice 23; the gas stopper bore 24; the reaction fluid inlet orifice in the retort neck 27; the longitudinal groove in the discharge stopper 26; the retort crop protrusion 19r for holding the reaction fluids 20r; the stopper bore conduit extension 25.

I claim:

1. A device for the photometric and/or spectrophotometric measurement and treatment of fluids comprising: a measuring cell with a cell top orifice and a transparent cross-sectional area; at least one retort acting as a reaction vessel and gas collecting chamber having a retort bottom orifice insertably and tightly mating with said top orifice of said cell for insertion and retraction of said retort; a retort top orifice superimposed over said retort bottom orifice; a vertical elongated cannula insertable tightly and retractably through said retort top and bottom orifies, said top cell-orifice and said transparent cross-sectional area of said cell being aligned during operation; said cannula having a lateral gas-feeding orifice and cannula valve means; said retort including at least one gas discharge and reaction fluid orifice with an inlet retort neck with valve means.

2. A device as in claim 1, said cannula valve means further comprising: a gas feeding retort stopper insertable tightly and rotatably mating with said retort top orifice and provided with a vertical cannula bore for vertical movements of said cannula therethrough and rotational means to rotate and to retract said cannula; a retort gas feeding orifice; said gas feeding retort-stopper having a gas feeding orifice in conduit connection with said retort gas feeding orifice and said cannula gas feeding orifice on assembly insertion and rotational alignment of said stopper with said cannula orifice and said retort gas feeding orifice.

3. A device as claimed in claim 1, said at least one gas-discharge retort neck comprising: a gas discharge stopper, tightly rotatably mounted within said gas discharge neck; said gas discharge retort neck provided with lateral discharge orifice and said stopper provided with a stopper bore in assembly on rotation of said stopper alignable into conduit connection with each other and said retort.

4. A device as claimed in claim 3, said at least one gas-discharge retort comprising: a reaction fluid inlet orifice in said neck; said stopper having a longitudinal groove connecting said retort with said reaction fluid orifice on alignment of said stopper rotationally.

5. A device as claimed in claim 1, said retort having a retort bottom crop protrusion for holding reaction fluid.

6. A device as claimed in claim 3, said stopper bore provided with a conduit extension into said retort bottom crop protrusion.

7. A device as claimed in claim 2, said at least one retort being a plurality of retorts, each having a retort crop bottom protrusion for holding a reaction fluid; each retort having said neck provided with a lateral neck orifice and a retort orifice stopper tightly rotatably mounted therein and provided with a bore and a conduit extension thereof reaching into said retort crop bottom; said neck orifice and said bore alignable into conduit with each other and said bottom on rotation of said stopper.

8. A device as claimed in claim 7, said retorts arranged symmetrically along the axis of said cannula with a common retort bottom orifice.

9. A device as claimed in claim 7, said stopper in each of said retort having a longitudinal groove connecting said retort with said reaction fluid orifice on alignment of said stopper rotationally.

References Cited

UNITED STATES PATENTS
3,225,601    12/1965    Shrewsbury.

FOREIGN PATENTS
724,121    7/1942    Germany.
971,745    10/1964    Great Britain.

OTHER REFERENCES

"A Simple Anaerobic Cell for the Beekman Spectro Photometer," McCormick et al., Analy. Chem. 33, (1) January 1961, p. 157.

"Optical Absorbtion Cells," by Opticell, 2 pages (figures & price list), Dec. 1, 1964.

"Modern Laboratory Apparatus," Fisher et al., Item 6–477, Oxidation Tube, Thunberg, 1942, p. 274.

RONALD L. WIBERT, Primary Examiner

R. J. WEBSTER, Assistant Examiner

U.S. Cl. X.R.

23—253, 254; 235—92; 356—244